United States Patent
Massner (10) Patent No.: US 9,038,370 B2
(45) Date of Patent: May 26, 2015

(54) METHOD FOR OPERATING AN EXHAUST EMISSION CONTROL SYSTEM HAVING A SCR-CATALYST AND AN UPSTREAM OXIDATION CATALYST EXHAUST EMISSION CONTROL COMPONENT

(75) Inventor: Alexander Massner, Esslingen (DE)

(73) Assignee: Daimler AG, Stuttgart (DE)

( * ) Notice: Subject to any disclaimer, the term of this patent is extended or adjusted under 35 U.S.C. 154(b) by 1094 days.

(21) Appl. No.: 12/992,741

(22) PCT Filed: Sep. 4, 2009

(86) PCT No.: PCT/EP2009/006437
§ 371 (c)(1),
(2), (4) Date: Jan. 28, 2011

(87) PCT Pub. No.: WO2010/034403
PCT Pub. Date: Apr. 1, 2010

(65) Prior Publication Data
US 2011/0167801 A1 Jul. 14, 2011

(30) Foreign Application Priority Data
Sep. 26, 2008 (DE) .................. 10 2008 049 098

(51) Int. Cl.
*F01N 3/00* (2006.01)
*F01N 11/00* (2006.01)
(Continued)

(52) U.S. Cl.
CPC ............... *F01N 11/00* (2013.01); *F01N 3/021* (2013.01); *F01N 3/106* (2013.01); *F01N 3/2066* (2013.01); *F01N 3/208* (2013.01);
(Continued)

(58) Field of Classification Search
CPC ........ F01N 3/106; F01N 11/00; F01N 11/007; F01N 2550/02
USPC ............................ 60/277, 286, 301, 299, 273
See application file for complete search history.

(56) References Cited

U.S. PATENT DOCUMENTS 6,082,101 A  7/2000  Manaka et al.
6,701,707 B1  3/2004  Upadhyay et al.
(Continued)

FOREIGN PATENT DOCUMENTS

CN       1789678 A        4/2008
DE    197 32 167 A1       1/1998
(Continued)

OTHER PUBLICATIONS

Chinese-language Office Action dated Apr. 1, 2013 with English translation (Eight (8) pages).
(Continued)

*Primary Examiner* — Kenneth Bomberg
*Assistant Examiner* — Anthony Ayala Delgado
(74) *Attorney, Agent, or Firm* — Crowell & Moring LLP (57) ABSTRACT

A method for operating an exhaust emission control system of a motor vehicle internal combustion engine, in the exhaust gas line of which an oxidation-catalytically active exhaust emission control component is arranged upstream of a SCR-catalyst is provided. An ageing state of the oxidation-catalytically active exhaust emission control component is determined by correlating a hydrocarbon fraction present in the exhaust emission upstream of the oxidation-catalytically active exhaust emission component with a simultaneous nitrogen oxide conversion of the SCR-catalyst.

18 Claims, 3 Drawing Sheets

(51) Int. Cl.
*F01N 3/10* (2006.01)
*F01N 3/20* (2006.01)
*F01N 13/00* (2010.01)
*F01N 3/021* (2006.01)

(52) U.S. Cl.
CPC ...... *F01N 2430/085* (2013.01); *F01N 2550/02* (2013.01); *F01N 2560/021* (2013.01); *F01N 2560/023* (2013.01); *F01N 2560/025* (2013.01); *F01N 2560/026* (2013.01); *F01N 2560/06* (2013.01); *F01N 2560/08* (2013.01); *F01N 2560/14* (2013.01); *F01N 2610/02* (2013.01); *F01N 2610/03* (2013.01); *Y02T 10/47* (2013.01); *Y02T 10/24* (2013.01); F01N 13/009 (2014.06)

(56) References Cited

U.S. PATENT DOCUMENTS

| | | | |
|---|---|---|---|
| 6,739,176 | B2 | 5/2004 | Neuhausen et al. |
| 7,409,821 | B2 | 8/2008 | Miura |
| 8,141,340 | B2* | 3/2012 | Garimella et al. ............... 60/277 |
| 2001/0033815 | A1 | 10/2001 | Neuhausen et al. |
| 2007/0044457 | A1* | 3/2007 | Upadhyay et al. ............... 60/295 |
| 2008/0069750 | A1 | 3/2008 | Oberski et al. |
| 2008/0302085 | A1* | 12/2008 | Hinz et al. ....................... 60/276 |
| 2010/0024397 | A1* | 2/2010 | Chi et al. ......................... 60/285 |
| 2010/0101213 | A1* | 4/2010 | Tuomivaara et al. ............ 60/276 |
| 2011/0296816 | A1* | 12/2011 | Parmentier et al. ............. 60/274 |
| 2012/0006002 | A1 | 1/2012 | Hagimoto et al. |

FOREIGN PATENT DOCUMENTS

| | | |
|---|---|---|
| EP | 1 136 671 A1 | 9/2001 |
| JP | 10-37741 A | 2/1998 |
| JP | 10-259714 A | 9/1998 |
| JP | 2004-100699 A | 4/2004 |
| JP | 2007-154819 A | 6/2007 |
| JP | 2008-523305 A | 7/2008 |
| RU | 2 059 080 C1 | 4/1996 |
| RU | 2 059 080 C2 | 4/1996 |
| RU | 2 267 619 C2 | 4/2003 |
| WO | WO 2006/065179 A1 | 6/2006 |
| WO | WO 2008/002907 A2 | 1/2008 |
| WO | WO 2010/113269 A1 | 10/2010 |

OTHER PUBLICATIONS

Chinese-language Office Action dated Aug. 28, 2013 with partial English translation (Seven (7) pages).
Russian-language Search Report dated Mar. 27, 2013 (Five (5) pages).
International Search Report with partial English translation dated Dec. 3, 2009 (Seven (7) pages).
PCT/ISA/237 (Six (6) pages).
Chinese Office Action dated Sep. 21, 2012 (five (5) pages).
Japanese Office Action dated Nov. 21, 2012 (five (5) pages).

* cited by examiner

Fig. 5

METHOD FOR OPERATING AN EXHAUST EMISSION CONTROL SYSTEM HAVING A SCR-CATALYST AND AN UPSTREAM OXIDATION CATALYST EXHAUST EMISSION CONTROL COMPONENT

CROSS-REFERENCE TO RELATED APPLICATIONS

The present application is a national stage of PCT International Application No. PCT/EP2009/006437, filed Sep. 4, 2009, and claims priority under 35 U.S.C. §119 to German Patent Application No. 10 2008 049 098.9, filed Sep. 26, 2008, the entire disclosures of which are herein expressly incorporated by reference.

BACKGROUND AND SUMMARY OF THE INVENTION

The invention relates to a method for operating an exhaust gas emission control system of a motor vehicle internal combustion engine, in which an oxidation-catalytically active exhaust gas emission control component exhaust is arranged in the gas line upstream of an SCR catalyst, wherein an ageing state of the oxidation-catalytically active exhaust gas emission control component is determined.

The use of an oxidation-catalytically active exhaust gas emission control component in exhaust gas emission control systems of motor vehicles with an internal combustion engine is common for reducing damaging exhaust gas emissions. The knowledge of the ageing state of the oxidation-catalytically active exhaust gas emission control component is particularly important with the presence of further exhaust gas emission control systems connected downstream. With a decrease of the catalytic cleaning capability of the oxidation-catalytically active exhaust gas emission control component caused by ageing, the operation of the exhaust gas emission control system can be adapted correspondingly or a necessary change can be indicated.

DE 197 32 167 A1 discloses a method for determining the ageing state of an oxidation-catalytically active exhaust gas emission control component where an exhaust gas emission control characteristic of the exhaust gas emission control component is determined and compared to a reference characteristic. In particular, an ageing is diagnosed if impermissible deviations from the reference characteristic result in an ascent section.

With this method, the necessity of having to provide a corresponding sensor system for determining the exhaust gas emission control characteristics is disadvantageous.

Exemplary embodiments of the present invention provide a method for operating an exhaust gas emission control system with an oxidation-catalytically active exhaust gas emission control component, in which an ageing state of the oxidation-catalytically active exhaust gas emission control component can be determined with little effort regarding the apparatus.

Exemplary embodiments of the present invention provide a method for operating an exhaust gas emission control system of a motor vehicle internal combustion engine, in the exhaust gas line of which an oxidation-catalytically active exhaust gas emission control component is arranged upstream of a SCR-catalyst in which an ageing state of the oxidation-catalytically active exhaust gas emission control component is determined by correlating a hydrocarbon fraction present in the exhaust gas emission upstream of the oxidation-catalytically active exhaust emission component with a simultaneous nitrogen oxide conversion of the SCR-catalyst.

The ageing state of the oxidation-catalytically active exhaust emission control component is determined with the method of the invention by correlating a hydrocarbon fraction present in the exhaust gas upstream of the oxidation-catalytically active exhaust gas emission component with a simultaneously present nitrogen oxide conversion of the SCR-catalyst.

The invention uses the surprising finding that a conversion of nitrogen oxides (NOx) to nitrogen ($N_2$) that can be achieved by the SCR catalyst depends on the ageing state of the oxidation-catalytically active exhaust gas emission control component connected upstream at least with certain operating conditions. This is due to the ability of the oxidation-catalytically active exhaust gas emission control component to be able to change the exhaust gas composition by oxidation of oxidizable exhaust gas components such as nitrogen monoxide (NO), hydrogen ($H_2$), carbon monoxide (CO) and/or hydrocarbons (HC). A change of the exhaust gas component, particularly an increase of the fraction of nitrogen dioxide ($NO_2$) effected by the oxidation-catalytically active exhaust gas emission control component has again a repercussion on the achievable NOx conversion of the SCR catalyst. The ability to change the exhaust gas composition is, however, reduced with an increasing ageing of the oxidation-catalytically active exhaust gas emission control component. According to the invention, HC is consulted as a test substance for checking the capability of the oxidation-catalytically active exhaust gas emission control component for changing the exhaust gas composition and thus for influencing the NOx conversion capability of the SCR catalyst, and a determination of the ageing state of the oxidation-catalytically active exhaust gas emission control component takes place by a correlation of the HC fraction effective upstream of the oxidation-catalytically active exhaust gas emission control component with the simultaneously present NOx conversion of the SCR catalyst.

Generally, an oxidation-catalytically active exhaust gas emission control component is meant to be each component serving for an exhaust gas cleaning, which supports at least an oxidation of NO. The oxidation-catalytically active exhaust gas emission control component can be, for example, an oxidation catalyst or a particle filter with an oxidation-catalytically active coating or a combination of the mentioned components. An SCR catalyst is a catalyst that can catalyze a reduction of NOx under oxidizing conditions, particularly by means of ammonia ($NH_3$) as selective reducing agent. It is typically in particular an iron-containing zeolitic SCR catalyst.

In an arrangement of the method according to the invention, different HC fractions are adjusted in the exhaust gas upstream of the oxidation-catalytically active exhaust gas emission control component and a HC fraction associated with an undercutting of a presettable NOx conversion is consulted as the basis for determining the ageing state. By a variation of the HC fraction, it can be determined in a more exact manner if and how far the HC fraction upstream of the oxidation-catalytically active exhaust gas emission control component influences a change of the exhaust gas composition, and in particular the $NO_2$ content downstream of the oxidation-catalytically active exhaust gas emission control component and to what extent the NOx conversion of the SCR catalyst is influenced. By the correlation of the NOx conversion and the HC content, an ageing state can be concluded. A comparison with reference values can be carried out, which were previously determined empirically and which are, for example, available as ageing characteristic line. The HC can be present in the exhaust gas as non-combusted or partially combusted fuel components and can, for example, be introduced into the exhaust gas by motoric after-injection and/or by a secondary injection of fuel into the exhaust gas effected from the outside. It could be determined that the amount of the HC content, where a typically present NOx maximum conversion of the SCR catalyst is undercut, represents a reliable measure for the ageing state of the oxidation-catalytically active exhaust gas emission control component and thus characterizes this in a particularly reliable manner.

In a further arrangement of the invention, the adjustment of different HC fractions in the exhaust gas takes place at an operating point with a temperature of the oxidation-catalytically active exhaust gas emission control component, where an oxidation of NO to $NO_2$ catalyzed by the oxidation-catalytically active exhaust gas emission control component. The operating point is characterized by temperatures of about 200° C. to 350° C., chamber speeds of the exhaust gas of about 50000 1/h and oxygen contents in the exhaust gas of 2% to 15%. A reduced HC conversion of the oxidation-catalytically active exhaust gas emission control component caused by ageing strengthens an inhibition of the $NO_2$ formation typically present effected by HC, which is particularly noticeable at an operating point where the $NO_2$ formation of an oxidation-catalytically active exhaust gas emission control component that has not aged is approximately maximal. With a reduced $NO_2$ formation the NOx conversion of the SCR catalyst arranged downstream is, however, typically reduced. This is why the ageing state of the oxidation-catalytically active exhaust gas emission control component can be determined in a particularly reliable manner by correlation of the HC content and NOx conversion by means of the method procedure of the invention.

The adjustment of different HC fractions in the exhaust gas takes place in a further arrangement of the invention at an operating point with a temperature of the SCR catalyst in the region between 180° C. and 350° C. A comparatively strong dependence for the NOx conversion capability of the SCR catalyst on the $NO_2$ content or from the ratio of $NO_2$ to NOx of the exhaust gas is given in this temperature region, wherein the oxidation-catalytically active exhaust gas emission control component can oxidize NO to $NO_2$ on the other hand in dependence on age and in dependence on the HC content of the exhaust gas in a more or less effective manner. In the region between 180° C. and 350° C., and in particular at about 200° C., a particularly reliable determination of the ageing state is enabled by correlation of HC content and NOx conversion for conventional SCR catalysts. An operating point with an exhaust gas chamber speed of about 50000 1/h with regard to the SCR catalyst is preferred.

In a further arrangement, an adaption of a characteristic field is provided for the operation of the exhaust gas emission control system for an oxidation of NO to $NO_2$ effected by the oxidation-catalytically active exhaust gas emission control component depending on the determined ageing state. Characteristic fields for the $NO_2$ formation are typically used for a modeling of a NOx conversion of the SCR catalyst or for the model-based dosing of the reducing agent used at the SCR catalyst for a NOx conversion. If a particle filter is provided in the exhaust gas line, its soot load state can be modeled depending on a $NO_2$ concentration present in the exhaust gas. Points of times are fixed in a fitted manner thereto, where a thermal forced regeneration is to be carried out. By means of an adaptation or adaption of a provided characteristic field or a characteristic line regarding the $NO_2$ formation dependent on the operating state to the ageing of the oxidation-catalytically active exhaust gas emission control component, the mentioned and possibly further operating variable can be fixed optimally over the operation duration of the exhaust gas emission control system.

In this manner, an excessive deterioration of the cleaning effect of the exhaust cleaning system altogether caused by the ageing of the oxidation-catalytically effective exhaust gas emission control component and an undesired higher fuel usage due to more frequent forced generations of the particle filter are avoided.

Advantageous embodiments of the invention are illustrated in the drawings and are described in the following. The previously mentioned characteristics and which will still be explained in the following cannot only be used in the respectively given combination but also in other combinations or on their own without leaving the scope of the present invention.

DETAILED DESCRIPTION OF THE DRAWING FIGURES

Figure 1:
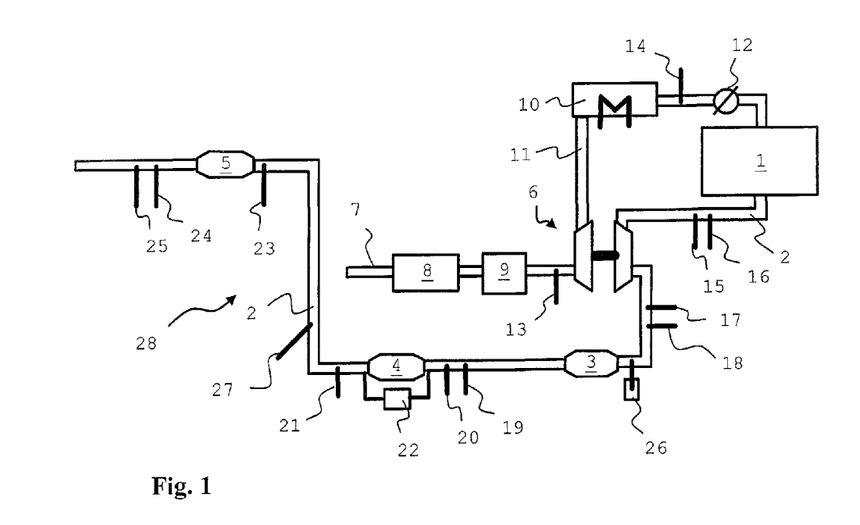
FIG. 1 is a schematic block diagram of a motor vehicle internal combustion engine with a connected exhaust gas emission control system with a SCR catalyst and an oxidation-catalytically active exhaust gas emission control component arranged upstream.

FIG. 1 shows a schematic block diagram of an internal combustion engine 1 of a motor vehicle (not illustrated) with an associated exhaust gas emission control system 28 in an exemplary manner. The internal combustion engine 1 can be an air-compressing internal combustion engine, referred to herein as a diesel engine. The exhaust gas ejected from the diesel engine 1, typically containing more or less oxygen, is received by an exhaust gas line 2 and successively flows through an oxidation catalyst 3, a particle filter 4 and a NOx reduction catalyst 5. A second oxidation catalyst, not shown, as a so-called blocking catalyst, is preferably connected downstream of the NOx reduction catalyst 5 for the oxidation of reduction means slipping through the NOx reduction catalyst 5. The oxidation catalyst 3 and the particle filter 4 can be arranged closely adjacent to each other in a common housing. An arrangement of oxidation catalyst 3, particle filter 4, NOx reduction catalyst 5 and possibly present blocking catalyst in a common housing is preferred, whereby an exhaust muffler is formed at the same time. The particle filter 4 can be provided with a catalytic coating which promotes a soot combustion and/or a NO oxidation. The oxidation catalyst 3 and the particle filter 4 insofar represent respectively separately or seen as a common assembly an oxidation-catalytically active exhaust gas emission control component in the sense of the invention.

For heating the oxidation catalyst 3 or of the exhaust gas, a heating device 26 can be arranged in the exhaust gas line 2 on the input side of the oxidation catalyst 3. The heating device 26 can be formed as an electrical heating element or also as a reformer supplying heat or a pre-combustor. One arrangement as injection device of fuel is also possible, which effects an exhaust gas heating with oxidation at the following oxidation catalyst 3. A heating of the exhaust gas can be performed using a forced regeneration of the particle filter 4 by soot combustion. For determining the necessity of such a regeneration, a differential pressure sensor 22 is associated with the particle filter 4, which sensor delivers a signal that can be evaluated with regard to a particle load. Furthermore, an exhaust gas turbocharger 6 is provided, whose turbine is driven by the exhaust gas flow and whose compressor feeds air taken in via an intake air line 7 to the diesel engine 1 via an air feed line 11. The exhaust gas turbocharger 6 is preferably formed as a so-called VTG charger with a variable adjustment of its turbine blades.

A throttle flap 12 is arranged in the air feed line 11 for the adjustment of the air amount fed to the diesel engine. An air filter 8 or an air mass meter 9 is arranged in the intake air line 7 for cleaning the intake air or for measuring the intake air amount. A charge-air cooler 10 arranged in the air feed line cools the compressed intake air. Furthermore, an exhaust gas return (not illustrated), which can be adjusted via an exhaust gas return valve is provided, with which a predetermined amount of returned exhaust gas of the intake air can be fed.

A feed point with a dosing unit 27 is arranged upstream of the NOx reduction catalyst 5 for feeding a reducing agent to the exhaust gas. The supply of the dosing unit 27 with the reducing agent takes place from a container (not illustrated). In the following it is assumed that the reducing agent is an aqueous urea solution which is fed to the exhaust gas via the dosing unit 27 in a dosed manner. $NH_3$ is released in the hot exhaust gas by thermolysis and/or hydrolysis, which $NH_3$ acts selectively with regard to the reduction of NOX contained in the exhaust gas. The NOx reduction catalyst 5 is accordingly formed as a classical SCR catalyst based on $V_2O_5/WO_3$ or as a supported SCR catalyst coated with zeolite. The method according to the invention can however also be used advantageously for dosing other reducing agents in a free or bound form.

A control unit (not illustrated) is provided for controlling the operation of the exhaust gas emission control system 28 and of the diesel engine 1. The control unit obtains information regarding operating state variables of the diesel engine 1 and of the exhaust gas emission control system 28. Information regarding engine operating variables can, for example, relate to an output torque or a speed. The control unit can include a calculation unit and a storage unit and an input-output unit. The control unit can carry out complex signal processing procedures and sense the operation of the diesel engine 1 and of the exhaust gas emission control system and to control or regulate it. Characteristic fields used for this are deposited in the storage device, wherein an adaptive adaptation of the characteristic fields can also be provided. The characteristic fields mainly relate to the decisive state variables such as mass flow, raw emission, temperature depending on the operating state variables of the diesel engine 1 such as load, speed, air ratio number etc. Furthermore, characteristic fields for the decisive state variables of the oxidation catalyst 3, of the particle filter 4 and of the SCR catalyst 5 are provided.

Regarding the SCR catalyst 5, these characteristic fields relate to the NOx conversion of the efficiency with regard to the NOx conversion and the $NH_3$ storage capability in dependence on influence variables decisive for this, in particular in dependence on the concentration ratio of $NO_2$ and NOx in the exhaust gas. For the oxidation catalyst 3, characteristic lines or characteristic fields regarding the temperature and flow rate dependence of its conversion capability or its starting temperature are provided, in particular in dependence on its ageing state. For the particle filter 4, characteristic lines and characteristic fields are provided regarding its particle charge in dependence on the exhaust gas pressure or on the pressure loss and characteristic fields regarding the oxidation of accumulated soot particles by $NO_2$ contained in the exhaust gas.

The sensing of operating states of the diesel engine 1 and of the exhaust gas emission control system 28 and the associated units can take place at least partially using suitable sensors. For example, FIG. 1 depicts pressure sensors 13 and 15 for a pressure in front of the compressor and a pressure in front of the turbine of the turbocharger and temperature sensors 14, 16, 18, 19, 21, 23 and 24 for respectively a temperature behind the charge-air cooler 10, in front of the turbine, in front of the oxidation catalyst 3, in front and behind the particle filter 4 and in front of and behind the SCR catalyst 5. Further sensors, particularly for sensing exhaust gas components, can also be provided. A lambda sensor 17 and sensors 20 and 25 are for example provided for the nitrogen oxide and/or $NH_3$ content in the exhaust gas. The signals of the sensors are processed by the control unit, so that the essential state variables are always present and the operating point of the diesel engine can be changed, if necessary, in such a manner that an optimal or desired operation of the exhaust gas emission control system 28 is enabled. A calculating modeling of the behavior of oxidation catalyst 3, particle filter 4 and SCR catalyst 5 preferably takes place, which reverts to the mentioned characteristic lines and characteristic fields, wherein their adaption can be provided with changes caused by ageing. A continuous monitoring of the behavior takes place by means of the provided sensors.

Figure 2:
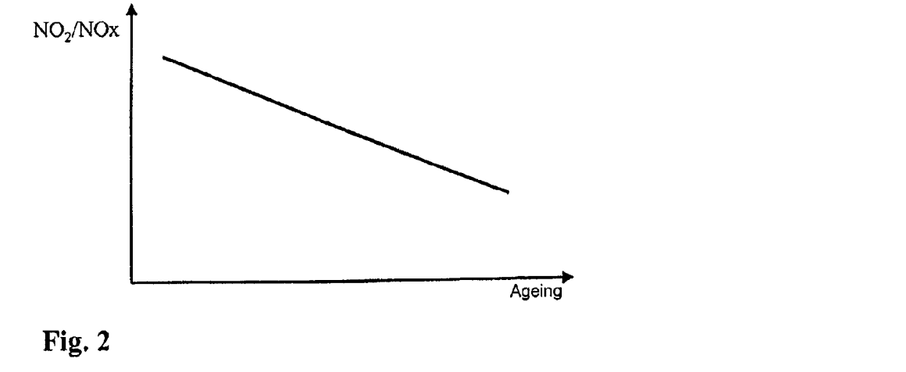
FIG. 2 is a diagram for clarifying the ageing dependence of the concentration ratio of $NO_2$ and NOx in the exhaust gas present on the output side of an oxidation-catalytically active exhaust gas emission control system.
Figure 3:
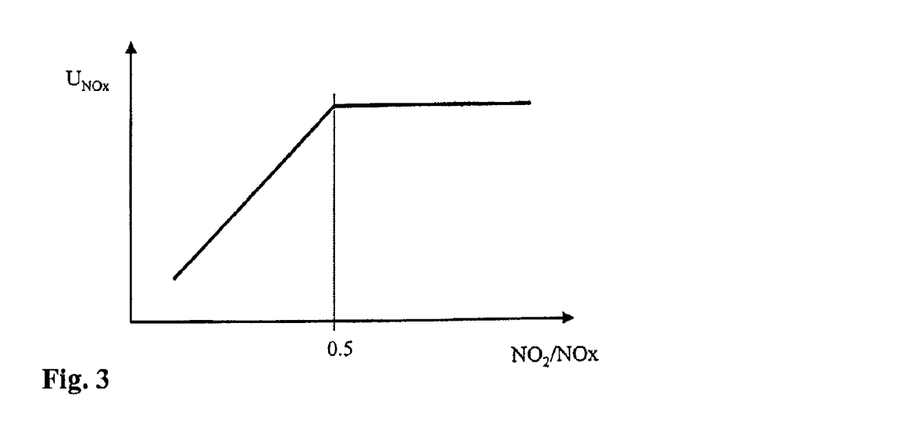
FIG. 3 is a diagram for the clarifying a typically present dependence of the NOx conversion of a SCR catalyst on the concentration ratio of $NO_2$ and NOx in the exhaust gas.

FIGS. 2 and 3 are initially referred to for an explanation of the procedure according to the invention.

FIG. 2 shows schematically in a diagram a concentration ratio of $NO_2$ and NOx in the exhaust gas present on the output side of the particle filter 4 typically given depending on the ageing state of the oxidation catalyst 3 and/or the oxidation-catalytically active coating of the particle filter 4. NOx is meant as the entirety of the nitrogen oxides NO and $NO_2$. As can be seen, reducing $NO_2$/NOx ratios in the exhaust gas result with increasing ageing. This has to be ascribed to the reduction in the capability of the oxidation catalyst 3 for the oxidation of NO present in the exhaust gas caused by ageing. It has to be noted in this connection that NOx emitted by the diesel engine is initially virtually completely as NO. The dependence shown in FIG. 2 is typically particularly highly developed with comparatively low exhaust gas temperatures in the region of 200° C. and 350° C., particularly at about 200° C., and exhaust gas chamber speeds of about 50000 1/h or more. The ageing can be provided in the form of an ageing factor or is standardized in another manner, for example by correlation with a starting temperature for the CO or HC oxidation.

The $NO_2/NOx$ concentration ratio in the exhaust gas present in the exhaust gas on the output side of the particle filter 4 and thus on the input side of the exhaust gas catalyst 5 typically has an influence on the NOx conversion capability of the SCR catalyst 5. These ratios are shown schematically in FIG. 3. As can be seen, the NOx conversion initially increases starting from low $NO_2/NOx$ concentration ratios with increasing $NO_2/Nx$ ratios, and remains approximately constant with a further increasing $NO_2/NOx$ concentration ratio. It is thereby assumed that the SCR catalyst is operated optimally and at least approximately free of slip with regard to the reducing agent feed. Characteristically, no significant increase of the NOx conversion can be achieved from a $NO_2/NOx$ concentration ratio of about 0.5 with an increasing $NO_2$ fraction. The dependence shown in the diagram of FIG. 3 is typically highly developed with comparatively low exhaust gas temperatures in the region of 200° C. and 350° C., particularly at about 200° C., and exhaust gas chamber speeds of about 50000 1/h or more.

Due to the explained ratios, a $NOx/NO_2$ concentration ratio of about 0.5 is desired using the operation of the exhaust gas emission control system 28 and particularly with temperatures of the SCR catalyst of less than 350° C. are desired in order to achieve a NOx conversion as high as possible. With a clearly higher $NO_2/NOx$ concentration ratio, the danger of an incomplete conversion of $NO_2$ exists under certain conditions.

Figure 4:
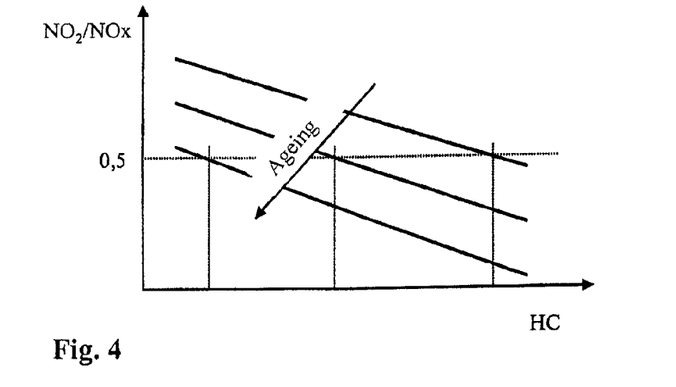
FIG. 4 is a diagram for clarifying the concentration ratio of $NO_2$ and NOx typically present on the output side of an oxidation-catalytically effective exhaust gas emission control component in dependence on the HC content on the input side of the oxidation-catalytically active exhaust gas emission control component with different ageing states.

As depicted in FIG. 2, the capability of the oxidation-catalytically active exhaust gas emission control component oxidation catalyst 3 and/or particle filter 4 for increasing the $NO_2/NOx$ concentration ratio decreases with increasing ageing. HC components in the exhaust gas also are inhibiting, which is explained by means of FIG. 4. FIG. 4 schematically shows in a diagram a typically given dependence of a concentration ratio of NO and NOx present on the output side of the particle filter 4 in the exhaust gas from the HC fraction in the exhaust gas upstream of the oxidation catalyst 3 for different ageing states of the oxidation catalyst 3 and/or of the oxidation-catalytically active coating of the particle filter 4. As can be seen, decreasing $NO_2/NOx$ concentration ratios result with an increasing HC fraction. Due to the additionally given dependence on the ageing state, the characteristic lines associated with an increasing ageing lie below each other. The limit of a $NO_2/NOx$ concentration ratio of 0.5 is, for example, already reached with a comparatively low HC content in the exhaust gas with an oxidation catalyst 3 that has aged more. In contrast to this, the HC tolerance of an oxidation catalyst 3 that has aged less is correspondingly higher as shown.

Figure 5:
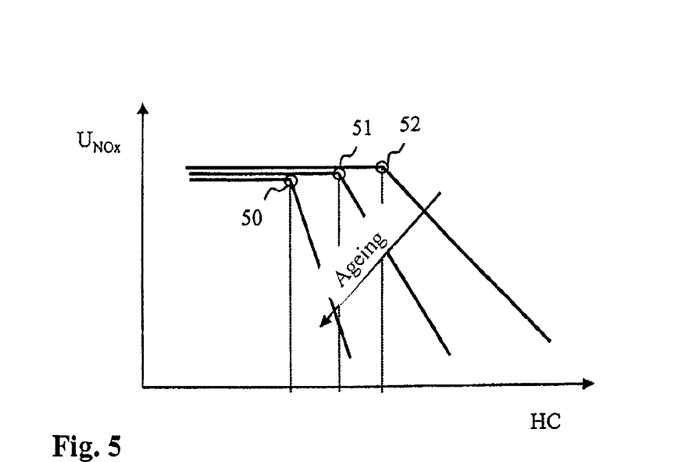
FIG. 5 is a diagram for clarifying the dependence of the NOx conversion of the SCR catalyst typically present for an exhaust gas emission control system according to FIG. 1 on the HC content upstream of an oxidation-catalytically active exhaust gas emission control component connected upstream and FIG. 6 is an ageing characteristic line shown schematically, obtained from the dependencies shown in the diagrams according to FIG. 2 and FIG. 3.

While considering the ratios shown in FIGS. 3 and 4, a correlation of the NOx conversion of the SCR catalyst and a HC content present upstream of the oxidation catalyst in the exhaust gas dependent on the ageing state of the oxidation catalyst 3 or of the oxidation-catalytically active coating of the particle filter 4 results. These ratios are schematically shown in the diagram of FIG. 5. The corresponding characteristic lines show an approximately constant and maximum NOx conversion with low HC fractions of the exhaust gas as a typical course. With an increasing HC fraction, a lowering of the NOx conversion with otherwise unchanged conditions is typically determined at a point 50, 51, 52 dependent on the ageing of the oxidation catalyst 3 and/or the oxidation-catalytically active coating of the particle filter 4. Particularly characteristic with comparable low exhaust gas temperatures in the region of 180° C. and 350° C. and exhaust gas chamber speeds of about 50000 1/h or more, is a more or less sharp bending of the characteristic lines and that can for example be detected by means of a suitable NOx sensor system.

Figure 6:
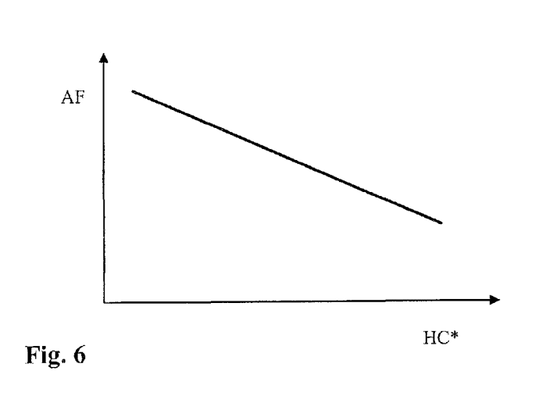

By means of previously empirically determined comparison characteristic lines, the position of a respective bending point 50, 51, 52 with regard to the associated HC content can be associated to a defined ageing state of the oxidation catalyst of the oxidation catalyst 3 and/or the oxidation-catalytically active coating of the particle filter 4. FIG. 6 schematically shows a diagram with a corresponding ageing characteristic line. The shown ageing characteristic line characterizes the dependence of an arbitrarily defined ageing factor AF on a HC fraction HC* in the exhaust gas present at a respective bending point 50, 51, 52 of the NOx conversion course according to FIG. 5 on the input side of the oxidation catalyst 3.

With the practical implementation of the method schematically explained above in its principal steps, a checking routine started, in which one then proceeds as follows. With a normal operation of the diesel engine, 1, the SCR catalyst is supplied with ammonia or urea solution with recourse to a model-based control or regulation in such a manner that a maximum conversion with a simultaneous maintaining of a presettable limit value for an ammonia slip results. If an operating point with presettable operating points is determined, the HC content of the exhaust gas is increased on the input side of the oxidation catalyst in steps with a presettable temporal distance by presettable amounts up to a presettable maximum amount. This can take place by activation of a late fuel after-injection into the combustion chambers of the diesel engine 1 or by the activation of a device for the secondary injection of fuel into the exhaust gas line 2. By means of the exhaust gas flow rate that can be determined by the control unit, the respective HC fraction in the exhaust gas is determined. A preferred operating point where a start of the checking routine is released or initiated is, for example, characterized by average chamber speeds of the oxidation catalyst 3 or of the SCR catalyst 5 of about 50000 1/h and a temperature of about 250° C. or about 200° C. of the oxidation catalyst and/or of the particle filter 4 or of the SCR catalyst 5.

An associated NOx conversion of the SCR catalyst 5 is determined for each HC fraction in the exhaust gas adjusted in the defined manner on the input side of the oxidation catalyst 3. The signal of the nitrogen oxide sensor 25 and a nitrogen content obtained in a measure-technical manner or given by means of characteristic lines is evaluated by the control unit upstream of the SCR catalyst 5. HC fractions and associated NOx conversions are explained as above by means of the diagram 5, transferred to a characteristic line and stored. After receiving the characteristic line, the checking routine is terminated and one returns to a normal engine operation without after-injection or secondary injection.

The determined characteristic line for the NOx conversion depending on the adjusted HC fraction is evaluated with regard to an undercutting of a HC fraction associated with a presettable NOx conversion. A characteristic value HC* is determined that provides the largest adjusted HC fraction of the exhaust gas, where the determined maximum NOx conversion is undercut by a presettable (low) measure. An advantageous alternative or additional evaluation routine comprises a calculating derivation of the characteristic line, that is, the determination of the characteristic line increase. A bending behavior of a characteristic line according to FIG. 5 becomes more apparent by a jump, which improves the evaluation reliability and exactness. As the characteristic value HC*, an undercutting of a presettable value for the characteristic line increase or the occurrence of a jump is defined hereby.

By means of checking routines carried out in a repeated manner in the course of the operation duration of the vehicle of the described type, a sensing of a temporal ageing course is possible. Accordingly, the present invention allows interventions into the operation of the diesel engine 1 or of the exhaust gas emission control system 28 depending on a determined ageing or a determined ageing course and to adapt this to the ageing state.

An adaption of a characteristic field stored for the operation of the exhaust gas emission control system 28 for an oxidation from NO to $NO_2$ depending on the determined ageing state effected by the respective oxidation-catalytically active exhaust gas emission control component is, for example, provided. This allows an adaptation of a dosing of a reducing agent for the NOx reduction at the SCR catalyst 5 with regard to the amount and with release temperature to the provision of $NO_2$ caused by ageing. It is further provided to let an amount of provided $NO_2$ reduced due to ageing flow into a conversion model for the NOx conversion of the SCR catalyst 5 and/or into a soot loading model of the particle filter 4. A possibly necessary shortening of time intervals for the forced particle filter regenerations can thereby be determined in a optimal manner. It is also provided to adapt a starting temperature for the oxidation of fuel or HC reduced due to a determined ageing with a determination of a release temperature for a HC or secondary fuel feed for a forced particle filter regeneration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an exhaust gas emission control system of a motor vehicle internal combustion engine, in the exhaust gas line of which an oxidation-catalytically active exhaust gas emission control component is arranged upstream of a SCR-catalyst, the method comprising:
   adjusting different hydrocarbon fractions in the exhaust gas upstream of the oxidation-catalytically active exhaust gas emission control component;
   determining an ageing state of the oxidation-catalytically active exhaust gas emission control component by correlating a hydrocarbon fraction present in the exhaust gas emission upstream of the oxidation-catalytically active exhaust emission component with a simultaneous nitrogen oxide conversion of the SCR-catalyst, wherein a hydrocarbon fraction associated with an undercutting of a presettable nitrogen oxide conversion is used as the basis for determining the ageing state; and
   adjusting operation of the internal combustion engine or the exhaust gas emission control system based on the determined ageing of the oxidation-catalytically active exhaust gas emission control component.

2. The method according to claim 1, wherein the adjustment of different hydrocarbon fractions in the exhaust gas takes place at an operating temperature of the oxidation-catalytically active exhaust gas emission control component, where an oxidation of nitrogen monoxide to nitrogen dioxide catalyzed by the oxidation-catalytically active exhaust gas emission control component in the fresh state is at least approximately at the maximum.

3. The method according to claim 1, wherein the adjustment of different hydrocarbon fractions in the exhaust gas takes place at an operating point with a temperature of the SCR catalyst in the region between 180° C. and 350° C.

4. The method according to claim 1, wherein the adjustment of the internal combustion engine or the exhaust gas emission control system involves an adaption of a characteristic field provided for the operation of the exhaust gas emission control system for an oxidation of nitrogen monoxide to nitrogen dioxide depending on the determined ageing state effected by the oxidation-catalytically active exhaust gas emission control component.

5. The method according to claim 4, wherein a modeling of the nitrogen oxide conversion of the SCR catalyst is carried out, and the characteristic field for the oxidation-catalytically exhaust gas emission control component from nitrogen monoxide to nitrogen dioxide is reverted to.

6. The method according to claim 4, wherein with a determination of times for a thermal forced generation of a particle filter arranged in the exhaust gas line, reverting to the characteristic field for oxidation from nitrogen monoxide to nitrogen dioxide effected by the oxidation-catalytically exhaust gas emission control component.

7. The method according to claim 5, wherein with a determination of times for a thermal forced generation of a particle filter arranged in the exhaust gas line, reverting to the characteristic field for oxidation from nitrogen monoxide to nitrogen dioxide effected by the oxidation-catalytically exhaust gas emission control component.

8. A method, comprising:
   supplying exhaust gas to an exhaust gas emission control system of a motor vehicle internal combustion engine, wherein the exhaust gas emission control system includes an oxidation-catalytically active exhaust gas emission control component arranged upstream of a SCR-catalyst;
   entering a checking routine to evaluate ageing of the oxidation-catalytically active exhaust gas emission control component, wherein the checking routine comprises
      adjusting the exhaust gas upstream of the oxidation-catalytically active exhaust gas emission control system to have a first hydrocarbon fraction;
      determining a first nitrogen oxide conversion of the SCR-catalyst for the exhaust gas having the first hydrocarbon fraction;
      adjusting the exhaust gas upstream of the oxidation-catalytically active exhaust gas emission control system to have a second hydrocarbon fraction;
      determining a second nitrogen oxide conversion of the SCR-catalyst for the exhaust gas having the second hydrocarbon fraction;
      determining an ageing state of the oxidation-catalytically active exhaust gas emission control component by
         generating a first correlation of the first hydrocarbon fraction with the first determined nitrogen oxide conversion of the SCR-catalyst;
         generating a second correlation of the second hydrocarbon fraction with the second determined nitrogen oxide conversion of the SCR-catalyst; and
         comparing the first and second correlations to stored correlation values;
   adjusting operation of the internal combustion engine or the exhaust gas emission control system based on the determined ageing of the oxidation-catalytically active exhaust gas emission control component,
   wherein the first and second hydrocarbon fractions are greater than zero.

9. The method of claim 8, wherein the second hydrocarbon fraction is greater than the first hydrocarbon fraction, and the method further comprises:
   increasing a hydrocarbon fraction of the exhaust gas in steps to hydrocarbon fractions greater than the second hydrocarbon fraction, wherein a nitrogen oxide conversion of the SCR-catalyst is determined for the exhaust gas for the hydrocarbon fractions of each step, and wherein the ageing state of the oxidation-catalytically active exhaust gas emission control component is determined using correlations between the hydrocarbon fractions of each step to the determined nitrogen oxide conversion of the SCR-catalyst of each step.

10. The method of claim 8, wherein the adjustment of the hydrocarbon fractions in the exhaust gas takes place at an operating temperature of the oxidation-catalytically active exhaust gas emission control component, where an oxidation of nitrogen monoxide to nitrogen dioxide catalyzed by the oxidation-catalytically active exhaust gas emission control component in the fresh state is at least approximately at the maximum.

11. The method of claim 8, wherein the adjustment of the hydrocarbon fractions in the exhaust gas takes place at an operating point with a temperature of the SCR catalyst in the region between 180° C. and 350° C.

12. The method of claim 8, wherein the adjustment of the internal combustion engine or the exhaust gas emission control system involves an adaption of a characteristic field provided for the operation of the exhaust gas emission control system for an oxidation of nitrogen monoxide to nitrogen dioxide depending on the determined ageing state effected by the oxidation-catalytically active exhaust gas emission control component.

13. The method of claim 12, wherein a modeling of the nitrogen oxide conversion of the SCR catalyst is carried out, and the characteristic field for the oxidation-catalytically exhaust gas emission control component from nitrogen monoxide to nitrogen dioxide is reverted to.

14. The method of claim 12, wherein with a determination of times for a thermal forced generation of a particle filter arranged in the exhaust gas line, reverting to the characteristic field for oxidation from nitrogen monoxide to nitrogen dioxide effected by the oxidation-catalytically exhaust gas emission control component.

15. The method of claim 14, wherein with a determination of times for a thermal forced generation of a particle filter arranged in the exhaust gas line, reverting to the characteristic field for oxidation from nitrogen monoxide to nitrogen dioxide effected by the oxidation-catalytically exhaust gas emission control component.

16. A method for operating an exhaust gas emission control system of a motor vehicle internal combustion engine, in the exhaust gas line of which an oxidation-catalytically active exhaust gas emission control component is arranged upstream of a SCR-catalyst, the method comprising:
 introducing hydrocarbon into exhaust gas such that a presettable hydrocarbon fraction is present in the exhaust gas upstream of the oxidation-catalytically active exhaust gas emission control component;
 introducing ammonia or urea solution into the exhaust gas downstream of the oxidation-catalytically active component and upstream of the SCR catalyst;
 determining a NOx conversion of the SCR catalyst caused by reduction of NOx with ammonia in the SCR catalyst, wherein the introduction of the hydrocarbon and the introduction of the ammonia or urea solution and the NOx conversion occur simultaneously;
 determining an ageing state of the oxidation-catalytically active exhaust gas emission control component by correlating the hydrocarbon fraction with the NOx conversion; and
 adjusting operation of the internal combustion engine or the exhaust gas emission control system based on the determined ageing of the oxidation-catalytically active exhaust gas emission control component.

17. The method of claim 16, further comprising:
 introducing hydrocarbon into the exhaust gas such that a second presettable hydrocarbon fraction is present in the exhaust gas upstream of the oxidation-catalytically active exhaust gas emission control component; and
 determining a second NOx conversion of the SCR catalyst caused by reduction of NOx with ammonia in the SCR catalyst when the second presettable hydrocarbon fraction is present in the exhaust gas,
 wherein the determined ageing is based on the determined NOx conversion and the determined second NOx conversion of the SCR catalyst.

18. The method of claim 16, wherein the adjustment of the internal combustion engine or the exhaust gas emission control system involves an adaption of a characteristic field provided for the operation of the exhaust gas emission control system for an oxidation of nitrogen monoxide to nitrogen dioxide depending on the determined ageing state effected by the oxidation-catalytically active exhaust gas emission control component.

* * * * *